July 11, 1967 L. PODOLSKY 3,330,703

THERMOELECTRIC ELEMENTS OF ORIENTED GRAPHITE CONTAINING SPACED BANDS OF METAL ATOMS

Filed May 18, 1962

INVENTOR.
LEON PODOLSKY

BY Frederick Breitenfeld
ATTORNEY

United States Patent Office 3,330,703

Patented July 11, 1967

3,330,703

THERMOELECTRIC ELEMENTS OF ORIENTED GRAPHITE CONTAINING SPACED BANDS OF METAL ATOMS

Leon Podolsky, 77 Wendell Ave., Pittsfield, Mass. 01201

Filed May 18, 1962, Ser. No. 195,681
2 Claims. (Cl. 136—239)

This invention relates generally to thermoelectric procedures and devices, and has particular reference to the employment of crystalline graphite for such purposes.

Thermoelectric devices of the type to which this invention relates include one or more junctions between dissimilar electrical conductors, whereby the application of heat to a junction induces current flow in a circuit, or whereby (conversely) the passage of current through the circuit will reduce the temperature at the junction. Such devices have a wide usefulness in many different industries.

The performance characteristics of thermoelectric devices can be conveniently rated by a value known as the "Figure of Merit." This parameter is proportional to the square of the thermoelectric E.M.F., and inversely proportional to resistivity and thermal conductivity, all measured in the direction of current flow, as indicated by the expression $$E.M.=\frac{E^2}{RK}$$

where:

$E$=thermoelecrtic voltage
$R$=resistivity, and
$K$=thermal conductivity

The substances most commonly employed in practice, where a high "Figure of Merit" is called for, are chiefly semiconductors or crystalline metallic combinations of substances from Group III and Groups V or VI of the Periodic Table, e.g., bismuth telluride. Graphite is in many respects superior to these materials because it is more stable, less subject to thermal diffusion and decomposition, more able to withstand thermal shock, and more easily provided with connection terminals. However, the "Figure of Merit" of graphite suffers from the circumstance that although thermoelectric E.M.F. is highest along the "*c*" axis of the crystal, and thermoconductvity lowest along this axis (both favorable factors), the resistivity is at its highest, unfortunately, along this axis.

It is an object of this invention to provide thermoelectric elements such as rods or equivalent bodies composed of suitably oriented crystalline graphite whose resistivity along the "*c*" axis has been appreciably reduced. More particularly, the object is to provide a graphite element having thermoelectric properties comparable to, and in some cases superior to, the "Figure of Merit" ratings of the best commercially available elements of similar kind and purpose composed of metals or metal alloys.

Another object is to provide such oriented crystalline graphite elements at low cost and with either electropositive or electronegative characteristics as may be desired.

Another object of the invention is to provide complete thermoelectric devices employing such graphite elements, whereby better, longer lasting, sturdier units can be produced, having performance ratings of a high order, all at relatively low cost.

Another object is to provide novel procedures for treating graphite to impart the desired characteristics to it, and for converting it into the form of useful thermoelectric elements having unusually high "Figure of Merit" ratings.

The invention is predicated, in part, upon the employment of penetrating radiation which, by impairment of the crystal lattice, enhances the thermoelectric properties of the graphite; upon the diffusion into the graphite of metal atoms to reduce resistivity, and upon the intermixture with the graphite of appropriate other materials to affect its electropositive and electronegative properties.

A particular feature of the invention resides in flash sintering a mass of comminuted graphite while it is retained under pressure so as to form a compacted body having highly oriented crystals.

Another feature resides in irradiating and diffusing metal atoms into the compacted body along regions transverse to the "*c*" axis, thereby enhancing the thermoelectric properties of the resultant element.

A general objective of the invention is to provide a thoroughly practicable and economically sound way to harness the useful qualities of graphite for thermoelectric purposes and to overcome the disadvantageous properties normally present, whereby thermoelectric elements and thermoelectric couples and devices employing graphite can be made commercially available on a competitive basis with the alloys, semiconductors and other materials presently used.

One manner of achieving these objects and advantages, and such other benefits as may hereinafter be pointed out, is illustrated by way of example in the accompanying drawings, in which—

In practicing the invention, a mass of graphite is first reduced, by any suitable means, to a comminuted form. The particle size should be very small, and preferably the particles should have diameters of five microns or less. The graphite may be of any available kind, either the naturally occurring type or the kind produced in electric furnaces or resulting from other industrial procedures. The graphite powder is calcined at temperatures between 1500° C. and 2500° C. to reduce any extraneous matter to inert ash and to drive out included and occluded oxygen. The calcining period may be from two to twenty-four hours, depending upon the source and type of graphite being processed.

Figure 1:
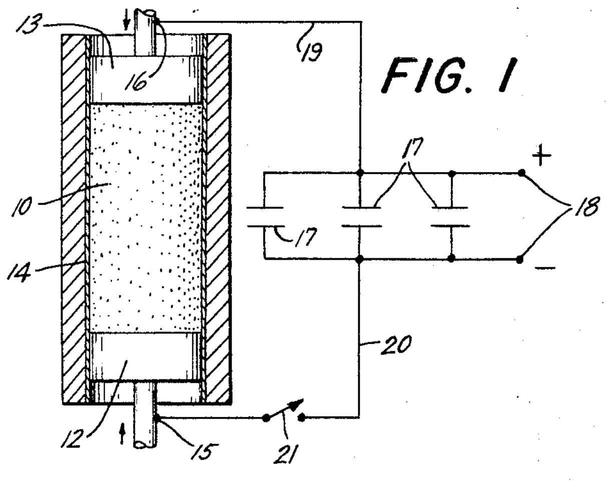
FIGURE 1 is a diagrammatic representation of apparatus suitable to produce a sintered compacted graphite body or element of the type to which the invention relates.

The powdered and calcined graphite is then molded into suitable elements. These elements are usually quite small, and may have any desired shape. By way of example, a substantially cylindrical shape has been depicted in the accompanying drawings. The procedure involves the introduction of a measured charge of the graphite, as indicated at 10 in FIGURE 1, into a suitably shaped mold 11. The mold shown is in the form of a cylinder having a plunger or piston 12 at one end and a plunger or piston 13 in the other end. The cylinder is made of adequately strong metal, such as steel, and the wall is lined with insulating material such as aluminum oxide or high resistance silicon carbide as indicated at 14. The pistons are also made of strong metal, preferably steel, and are electrically conductive. An electrical connection is established with the piston 12 at 15 and a similar electrical connection is established with the plunger 13 at 16. These connections lead to a circuit in which a multiplicity of capacitors 17 are arranged in parallel, and are chargeable by direct-current voltage applied at the input terminals 18. A lead 19 connects the point 16 with one side of the circuit, and a lead 20 connects the other side of the circuit to the point 15. A normally open switch 21 is arranged in this circuit.

The pressure apparatus will be of appropriate size and strength, depending upon the dimensions of the thermoelectric element to be produced. For example, the mass of graphite 10 may be compressed into a cylindrical body having a diameter of one-eighth to one-half inch or so, and a length of one inch or less. A relatively small body of this kind, having a length about twice its diameter, has proven satisfactory. The pressure applied to the graphite charge between the plungers 12 and 13 is of the order of 2,000 to 20,000 pounds per square inch. For the sake of convenience, the direction in which this pressure is applied will be referred to hereinafter as the "longitudinal" direction. It is obvious that this pressure is applied longitudinally while the mass of comminuted graphite is confined laterally by the walls of the cylinder 11.

While the graphite is under pressure, a pulse or charge of direct current is directed through it in the longitudinal direction, thereby producing a "flash sintering." The current employed is in the range of 1 to 100 amperes, and may be made available by appropriately charging the bank of capacitors 17 at a voltage between 5,000 and 10,000 volts. The current is allowed to be discharged from the capacitors through the graphite upon closing of the switch 21. After formation of the compacted body it is expelled from the cylinder by one or the other of the pistons.

Graphite bodies produced in this way have a bulk density of 1.6 to 2.0 grams per milli-liter, and exhibit extremely high orientation of the graphite crystals with the "*c*" axis in the longitudinal direction.

In some cases it is desirable to sinter the pressed bodies at high temperatures for a period of 4 to 8 hours, to improve mechanical strength. Such sintering does not destroy the "*c*" axis orientation of the graphite as long as this second sintering temperature does not exceed the original calcining temperature of the powder used.

The rods or bodies are then subjected to special treatments that enhance the thremoelectric properties and raise the "Figure of Merit" rating to a commercially useful value. One of these treatments resides in subjecting the compact element to penetrating radiation. The term "penetrating radiation" is intended to be used in its radioactive sense, i.e., it alludes to radiation capable of penetrating through one mm. of lead. For example, gamma rays, hard X-rays, neutrons, or other atomic particles can be used. Electron bombardment might be obtained from a multimillion-volt electrostatic accelerator; or gamma rays might be obtained from atomic piles or radioactive isotopes. The exact source and nature of the radiation is not critical, so long as it is sufficiently intense to cause a large number of defects in the crystal lattice of the graphite. It is known that the exposure of crystals, notably those of graphite, to penetrating radiation increases the existing number of lattic defects and thus increases the thermoelectric voltage obtainable from a material thus treated.

The other treatment to which the compacted graphite elements are subjected consists in allowing metal atoms to diffuse into the crystal lattice. It has long been known that the diffusion of metal, particularly the alkali metals such as potassium, into graphite brings about a marked reduction in electrical resistivity. While potassium is the preferred metal to be employed, other metals may also be used, notably boron, silicon, and molybdenum. The diffusion can be brought about in any convenient manner, e.g., by placing the rods or elements to be diffused into a vacuum chamber and exposing them to a source of metal vapor obtained from heated bulk metal, filaments, etc., or the metal can be applied to the rod or element in the form of a thin wire or foil, then heated in a vacuum to bring about vaporization and allow the vapor to enter the crystal lattice of the graphite.

Figure 2:
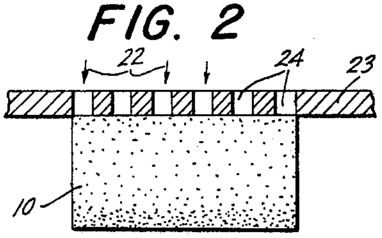
FIGURES 2 and 3 are schematic views of treatments to which the element is subjected.

Preferably the treatments described are performed successively, upon alternate longitudinal spaced regions of the graphite body. For example, as shown in FIGURE 2, the body 10 may be mounted in a jig (not shown) with one longitudinal surface exposed to penetrating radiation 22 through a slotted lead shield 23, the slots or openings 24 allowing the penetrating rays to impinge upon longitudinally spaced bands extending transverse to the longitudinal axis of the body 10. The element 10 might, if desired, be mounted for rotation on its longitudinal axis during this treatment. Such irradiation has been found to increase the thermoelectric voltage output of the oriented graphite rod by as much as 400%.

Figure 3:
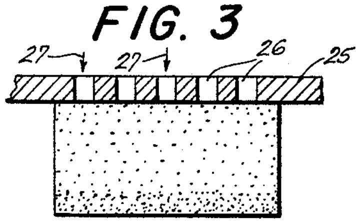

The irradiated elements may then be mounted in a second jig (not shown), and as shown in FIGURE 3 one longitudinal side may be shielded by a slotted plate 25 in which the slots 26 are so positioned that they expose the bands or regions that were shielded from radiation in FIGURE 2. Through the slots 26, diffusion of metal atoms may take place, as indicated by the arrows 27. Depending upon the vapor pressure of the metal used, the vacuum in the treatment chamber, and the temperature of the work, the diffusion can be achieved in just a few minutes. It has been found that this treatment greatly reduces the resistivity of the exposed sections without altering the thermoelectric properties of the element as a whole.

Figure 4:
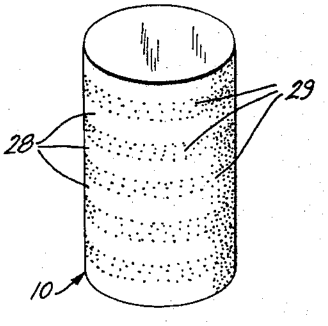
FIGURE 4 is a perspective view of the treated element.

The result of these treatments is depicted in FIG. 4. Although the successive band areas are not necessarily visibly different, they exist nevertheless. One set of them, designated 28, has been exposed to penetrating radiation; the other set 29 has been diffused with metal.

Rods or elements treated in the manner described manifest thermoconductivity along the "*c*" axis substantially as low as that of pure graphite, untreated; while the resistivity has been reduced to a point at which it is no more than twice that along the "*a*" axis. Since the resistivity along the "*c*" axis is normally 300 to 400 times as great as that along the "*a*" axis, the reduction in resistivity achieved by the present treatment is obviously of significant magnitude. Coupled with this low thermoconductivity and low resistivity along the "*c*" axis is a thermoelectric E.M.F. along the same axis of several hundred microvolts per degree centigrade. The enhancement of the potential difference can probably be explained, in part, by the interference of the crystal lattice defects with the flow of electrons. Also, to the extent to which the treatments have altered the successive transverse bands or areas to make one alternate set thermoelectrically different from the other, the treated element comprises a plurality of series-connected thermocouples which conjointly produce a voltage of appreciable and useful magnitude when the element is subjected to heat at one of its ends, and which conjointly operate in reverse series-connected manner when passage of current is intended to produce cold. There is also a probable sudden increase of potential at the interfaces between the treated sections.

The "Figure of Merit" of rods or elements treated as described is favorably comparable to, and in most cases, superior to, the ratings of similar thermoelectric rods or elements of conventional kinds. At the same time, thermoelectric elements manufactured in accordance with the present improved procedure are far less costly and have numerous advantages not present with thermoelectric elements composed of conventional alloys or semi-conductors.

When the rod or element is composed of pure graphite it is electropositive toward copper, nickel, and similar metals. It can be made electronegative by addition of certain materials able to withstand high temperatures, such as molybdenum compounds and the like. For example, the desired result is achieved by intimately mixing from 0.1% to 3.0% by weight of molybdenum disilicide ($MoSi_2$) with the graphite powder immediately after the calcining treatment and before the introduction of the powder into the pressure mold.

The improved thermoelectric elements can be employed in thermocouples for various industrial purposes, e.g., for electric power generation from thermal sources, or for production of cold on passage of current.

Prior to incorporation of the improved thermoelectric elements or rods into thermoelectric devices, the ends of the rods are appropriately treated to form electric connection terminals. This can be achieved by metallizing the ends by any suitable process, such as schoop spraying of a molten metal, or by firing on a suitable contact metal such as gold, or (preferably) a molybdenum-manganese compound.

Figure 5:
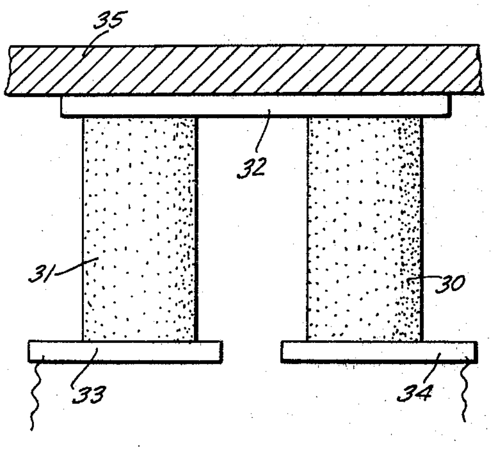
FIGURE 5 is a diagrammatic representation of an illustrative thermoelectric device employing two of the new elements, shown in operative heat transfering relationship to a wall or panel.

An illustrative thermocouple is shown in FIG. 5. An element or rod of the present improved character, of electropositive qualities, is shown at 30, and a similar element, of electronegative qualities, is shown at 31. These rods are joined at one end by a copper or equivalent cross-bar 32, and at their opposite ends they are connected to terminal elements 33 from which connections may be established with an appropriate electric circuit. The bar 32 is shown in thermoconductive relationship to a wall or panel 35

Assuming that the wall 35 is heated, e.g., by hot gases on the opposite side of the wall, electric current will be caused to flow in the circuit connected to the terminals 33, 34. Similarly, if the operation is reversed and electric current is directed through the circuit, the temperature will be reduced at 32, and heat can be withdrawn from the wall or panel 35, thus producing a cooling or refrigerating effect upon substances on the opposite side of the wall.

The foregoing discussion presupposes that the wall 35 is the wall of a tube or conduit or other chamber within which there is a source of heat, in the one case, or a substance to be cooled, in the other case.

The arrangement shown in FIGURE 5 is merely illustrative, and it will be readily understood that units of this character can be connected in series or parallel with other units similarly constituted and similarly positioned in thermoconductive contact with the wall 35. By way of example, if the wall 35 is at a temperature of from 1,500 to 2,000° centigrade, a voltage of 300 millivolts can be produced by a single unit as shown in FIGURE 5, employing thermoelectric elements manufactured as described.

It will be obvious that many of the details herein described and illustrated may be modified by those skilled in the art without necessarily departing from the spirit and scope of the invention as expressed in the appended claims.

What is claimed is:

1. A thermoelectric element consisting essentially of graphite and metal atoms, said element being a compacted graphite body having a longitudinal direction, the crystals of the graphite being highly oriented with their "*c*" axes extending in said longitudinal direction, and said metal atoms being present only within longitudinally spaced-apart transverse bands of said body.

2. A thermoelectric element as defined in claim 1, said body embodying crystal lattice defects in alternate longitudinally spaced-apart transverse bands between said metal-containing bands, said defects being engendered by penetrating radiation.

References Cited

UNITED STATES PATENTS

| | | | |
|---|---|---|---|
| 430,991 | 6/1890 | Davis | 23—209.1 |
| 711,031 | 11/1920 | Acheson | 23—209.1 |
| 1,906,853 | 5/1933 | Hediger | 23—208 A |
| 1,982,821 | 12/1934 | Marsden et al. | 23—209.2 |
| 2,195,297 | 3/1940 | Engle | 75—204 |
| 2,544,414 | 3/1951 | Bridgeman et al. | 23—209.1 D |
| 2,588,254 | 3/1952 | Lark-Horovitz et al. | 136—4 X |
| 2,714,556 | 8/1955 | Goetzel | 75—203 |
| 2,746,193 | 5/1956 | Billian | 204—154 |
| 2,945,793 | 7/1960 | Dugdale | 204—154 |
| 2,946,835 | 7/1960 | Westbrook et al. | 136—5 |
| 2,947,610 | 8/1960 | Hall | 23—209.1 |
| 2,955,145 | 10/1960 | Schrewelius | 136—5 |
| 2,992,901 | 7/1961 | Fisher et al. | 23—209.3 |
| 3,001,237 | 9/1961 | Balaguer | 264—27 |
| 3,001,238 | 9/1961 | Goeddel et al. | 264—27 |
| 3,071,495 | 1/1963 | Hanlein | 136—4 X |
| 3,124,936 | 3/1964 | Melehy | 136—4 X |
| 3,142,158 | 7/1964 | Podolsky | 136—5 X |

OTHER REFERENCES

Fuller, C. S., and Ditzenberger, J. A.: In "Phys. Rev." Ser. 2, 91 (1): p. 193, July 1, 1953.

Klein, C. A.: In "Rev. of Modern Phys.," 34 (1): pp. 56–79, January 1962.

Primak, W., and Fuchs, L. H.: In "Phys. Rev." Ser. 2, 103 (3): pp. 541–544, Aug. 1, 1956.

Ubbelohde, A. R., Blackman, L. C. F. and Dundes, P. H.: In "Nature," 1959 (19): pp. 595 and 596, May 9, 1959.

Ubbelohde, A. R., Blackman, L. C. F., and Mathews, J. F.: In "Nature," 183 (4659): pp. 454–456, Feb. 14, 1959.

Ubbelohde, A. R. and Orr, J.: In "Nature," 179 (4552): pp. 193 and 194, Jan. 26, 1957.

WINSTON A DOUGLAS, *Primary Examiner.*

JOHN H. MACK, *Examiner.*

A. M. BEKELMAN, *Assistant Examiner.*